United States Patent [19]

Katayama et al.

[11] 4,364,601

[45] Dec. 21, 1982

[54] VEHICLE SUN ROOF CONSTRUCTION

[75] Inventors: Yoshinori Katayama, Tokyo; Yoshimasa Tuchiya, Sayama, both of Japan

[73] Assignee: Nissan Motor Co., Ltd., Yokohama, Japan

[21] Appl. No.: 195,739

[22] Filed: Oct. 10, 1980

[30] Foreign Application Priority Data

Oct. 12, 1979 [JP] Japan ............................ 54-130797

[51] Int. Cl.³ .............................................. B60J 7/04
[52] U.S. Cl. ...................... 296/221; 296/222; 296/223
[58] Field of Search .............. 296/221, 222, 223, 224, 296/216

[56] References Cited

U.S. PATENT DOCUMENTS

| | | | |
|---|---|---|---|
| 3,507,537 | 4/1970 | Kouth | 296/221 |
| 3,572,822 | 3/1971 | Schmid | 296/221 |
| 4,085,965 | 4/1978 | Schlapp | 296/221 |
| 4,179,156 | 12/1979 | Huisman | 296/216 |

FOREIGN PATENT DOCUMENTS

| | | |
|---|---|---|
| 1920481 | 6/1968 | Fed. Rep. of Germany . |
| 7910778 | 8/1979 | Fed. Rep. of Germany . |
| 1582575 | 10/1969 | France . |
| 2318047 | 2/1977 | France . |
| 1435387 | 5/1976 | United Kingdom ................ 296/221 |

*Primary Examiner*—Robert R. Song
*Attorney, Agent, or Firm*—Thompson, Birch, Gauthier & Samuels

[57] ABSTRACT

A sun roof is arranged to descend without tilting (thus avoiding abrasion of the weather stripping) into a space below the roof panel and thereafter to slide into a housing for same. The actuating mechanism either reduces or maintains the distance between the shoes, which serve as bogies for the roof, to induce smooth sliding of the unit when moving in and out of the storage position, and applies the driving force to the leading pair of shoes to further increase the smoothness of the sliding when moving the unit from the storage housing. When tilting the sun roof for ventilation, the mechanism lifts one end and maintains the other end essentially stationary by applying a slight lift which offsets the tendency for the other end to sink due to the tilting. Again the weather strip is protected from abrasion.

11 Claims, 14 Drawing Figures

VEHICLE SUN ROOF CONSTRUCTION

BACKGROUND OF THE INVENTION

1. Field of the Invention

The present invention relates generally to automotive vehicle sun roofs and more particularly to a sun roof having an improved mechanism for actuating the sliding and tilting operations thereof.

2. Description of the Prior Art

In a known arrangement (see FIGS. 1, 2 and 3 of the drawings), it has been proposed to provide a vehicle 10 with a slidable sun roof 12 comprising a rigid panel 14 slidably mounted on guide rails 16, disposed on the right and left hand sides of a frame 18 attached to the lower surface of the vehicle roof panel 20. With this arrangement, the sun roof may be positioned to close the sun roof opening 22, may be tilted to partially open the opening or may be slidably moved rearwardly into a housing 23 defined between the roof panel 20 and frame 18. The mechanism interconnecting the sun roof and the vehicle by which the sliding and tilting of the sun roof is achieved takes the form of a pair of forward brackets 24 fixed to the lower surface of the sun roof at forward locations thereof. Each bracket is pivotally connected to forward shoes 26 which are respectively slidably received on the guide rails 16. This prior art sun roof is further provided with guide panels 30 in which shaped elongate slots 32 are formed. A pair of rear shoes 34 which slide on the guide rails 16 are fixedly connected to rackwires or cables 28 and are provided with pins 36 which slide in the slots 32 (thus defining a cam and cam follower arrangement). The rackwires or cables 28 extend close to and parallel with the guide rails 16 and are connected to a device (not shown) for moving same in the fore and aft directions of the vehicle. This sun roof arrangement, in order to locate the panel in the appropriate position for closing the sun roof opening 22, is provided with a structural member 38 which serves to limit the forward movement of the forward shoes 26, and another structural member 40 which serves as part of a latch arrangement. A third structural member 42 defines the other part of the latch mechanism and engages the member 40 to prevent the rearward movement of the sun roof.

With this arrangement, when it is desired to open the sun roof, the rackwires 28 are moved in the rearward direction, indicated by the arrow A. The pins 36 are accordingly driven up to the last and highest step of the shaped elongate slot 32, pulling the rear or aft end of the sun roof down into the cavity of the frame 18. Simultaneously, the sun roof pivots about the pivotal connection defined between the forward brackets 24 and the forward shoes 26 causing the forward end of the sun roof to project above the roof panel 20. This particular movement brings the structural members 40 and 42 out of contact, whereby with further rearward movement of the rear shoes (in response to movement of the rackwires 28), the sun roof is then drawn into the housing 23.

To tilt this sun roof for ventilation only, the rackwires are moved in the forward direction, indicated by the arrow B, whereby the rear shoes 34 slide forward. The pins 36 accordingly trace along the slots 32 forcing the rear end of the sun roof to project above the roof panel and the forward end to sink below same (see FIG. 3).

However, this arrangement has suffered from a number of drawbacks. When the sun roof is moved into its storage position, the distance between the forward and rear shoes increases, inviting unstable or jerky sliding. This phenomenon is more pronounced when attempting to move the sun roof back out of the storage position for closing the sun roof opening as the sun roof is virtually pushed from the rear end (in contrast with being pulled from the forward end). This jerky operation, of course, requires a greater force to be applied to the rackwires in order to overcome the braking-like action induced by the jerky sliding. Moreover, the tilting action of the sun roof when ventilation is required rubs a sealing weather strip 44 against the downward depending flange of the roof panel 20 and/or the bathtub-like frame 18. This, of course, hastens the time when the strip will fail to seal the gap between the sun roof and the perimeter of the sun roof opening 22.

For a full and detailed description of the prior art sun roof arrangement set forth hereinabove, refer to U.S. Pat. No. 3,507,537, issued on Apr. 21, 1970, to Herbert Kouth, et al.

SUMMARY OF THE INVENTION

The present invention features a sun roof mechanism which enables the sun roof to descend, without tilting, into a cavity defined within a mounting frame, and subsequently, to slide from that position into a housing located aft of the sun roof opening and between the vehicle roof and the mounting frame. The present invention further provides a mechanism for tilting the sun roof for ventilation of the vehicle cabin wherein, while the aft end of the sun roof lifts is raised above the roof line, the forward end remains essentially stationary, eliminating the abrasion of the weather strip that plagues the previously discussed prior art device. A further important feature of the invention is the fact that the distance between the forward and rear shoes either decreases or remains constant and the forward shoes rather than the rear shoes are driven by the rackwires. Therefore, the jerky sliding induced by the separation of the forward and rear shoes in the prior art is eliminated, and when the sun roof is removed from its storage position below the roof, the sun roof is drawn at its forward end which promotes smooth sliding, permitting a reduced force to be applied to the rackwires of the arrangement.

BRIEF DESCRIPTION OF THE DRAWINGS

The features and advantages of the slide mechanism according to the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 1:
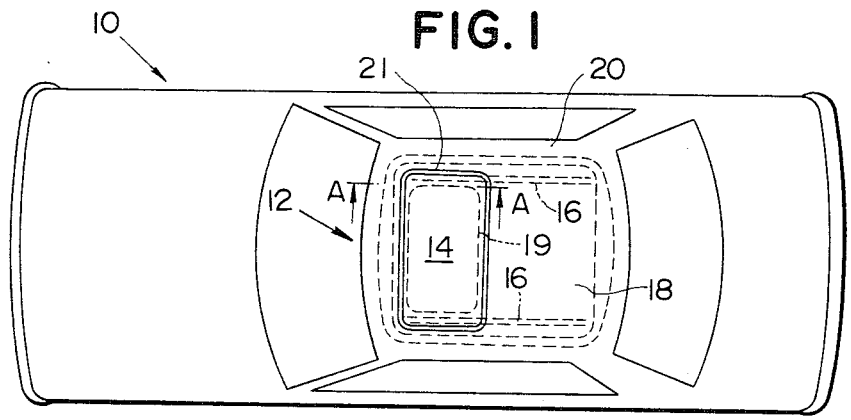
FIG. 1 is a plan view of a vehicle equipped with a sun roof.
Figure 2:
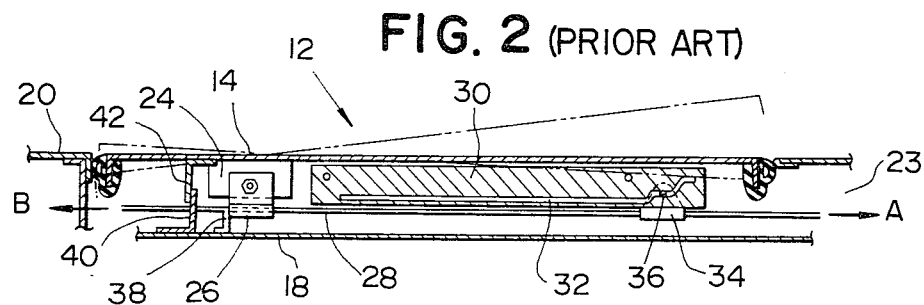
FIG. 2 is a sectional view taken along section line A—A of FIG. 1, wherein the vehicle is equipped with a prior art sun roof.
Figure 3:
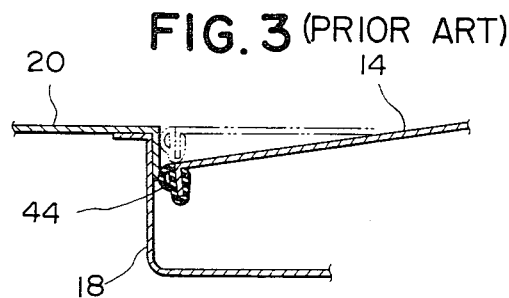
FIG. 3 is a view of a portion of FIG. 2 showing the position assumed by the prior art sun roof when tilted for ventilation.
Figure 4:
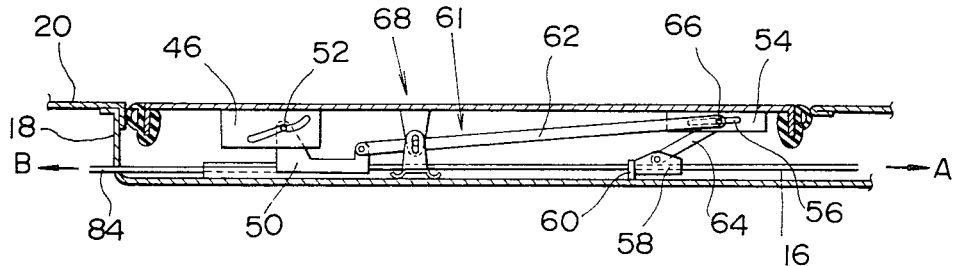
FIGS. 4 to 7 are sectional views taken along section line A—A of FIG. 1, wherein the vehicle is equipped with a sun roof according to a first embodiment of the present invention.
Figure 5:
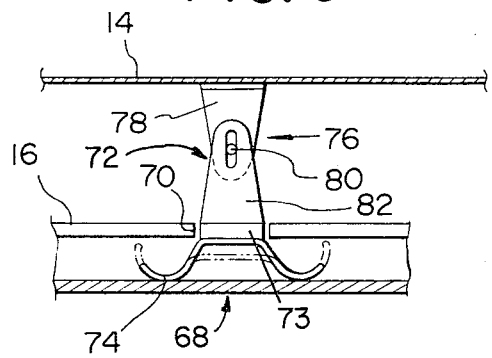
Figure 6:
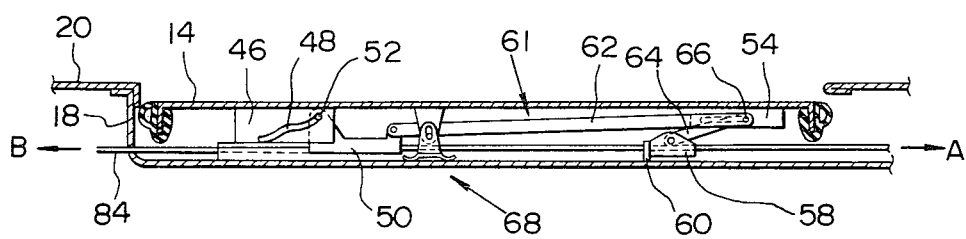
Figure 7:
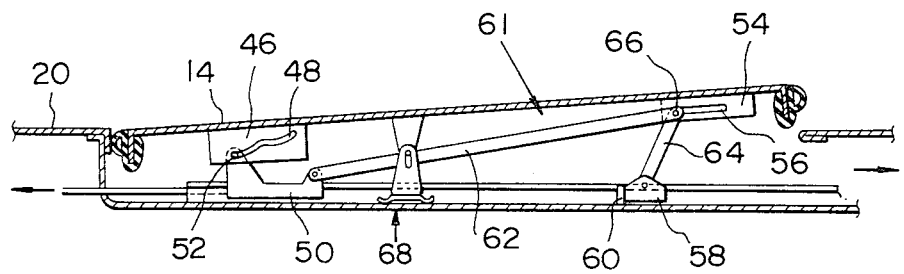

Turning now to FIGS. 1 and 4 to 7 of the drawings, a first embodiment of the present invention is shown. This embodiment has a roof panel 20 having an aperture 21 closed by a rigid panel 14, a frame 18 defining a space including a housing 23 between it and the roof panel, a pair of guide rails 16 disposed on either side of the aperture 19 formed in the frame 18. The sun roof actuating mechanism comprises a first pair of guide plates 46 arranged to depend from a forward or first end of the rigid panel 14. Each of these guide plates is formed with a shaped slot 48 which rises as it leads toward the aft or second end of the rigid panel. A pair of forward or first slidable shoes 50 are each disposed on a guide rail. Each of these shoes has a projection carrying thereon a pin 52 which is slidably received in the slot 48. A pair of second or rear guide plates 54 are arranged to depend from an aft or second end of the rigid panel 14. Each of these guide plates is formed with a straight slot 56. A pair of rear shoes 58 are slidably disposed on a guide rail. Each rear shoe is arranged to abut a stop 60 fixedly connected to the frame 18. This stop 60, as shown, limits the movement of the rear shoes 58 along the guide rails toward the forward or first end of the rigid panel. Operatively interconnecting the forward shoes 50, the rear shoes 58 and the rear guide plates 54 is a linkage system 61 which takes the form of two sets of two rods or levers 62 and 64. Each set is interconnected at first ends by a pin 66 which also slides in the slot 56. Each of the second ends of the rods 62, 64 is pivotally connected to respective forward and rear shoes.

To secure the rigid panel in a predetermined position such as that assumed when it closes the opening 21, a locking arrangement (or arrangements) 68 is/are provided. Each arrangement takes the form of an aperture 70 in one of the guide rails 16, a slide member 72 having a locking portion 73 disposed in the aperture, a suitably shaped leaf spring 74 located below the guide rail and attached to the slide member 72 to hold the locking portion 73 in the aperture so that the slide member 72 is prevented from sliding in either direction along the guide rail (or rails, in the case where a pair of locking arrangements are used), and a lost motion linkage 76 which takes the form of a bracket 78 depending from the rigid panel 14 and having a pin 80 thereon, and a slotted member 82 extending up from the locking portion 73 which receives the pin 80 in the slot thereof.

In this embodiment, the forward shoes 50 are drivingly connected to rackwires or cables 84 which may be driven in either direction by a device not shown.

Thus, with this embodiment, when it is desired to store the rigid panel in the housing 23 and accordingly open the sun roof, the cables 84 are moved in the rearward direction indicated by the arrow A. This draws or pulls the forward shoes (fixedly connected to the cables) in the same direction, forcing the pins 52 to trace up the shaped slots 48 and accordingly, draw the forward end of the rigid panel down into the space defined between the roof panel 20 and the frame 18. Simultaneously, the rods 62 are driven with the front shoes moving the pins 66 along the slots 56 causing the rods 64 to pivot clockwisely about the pins 66 to assume the position depicted in FIG. 6, and accordingly draw the rear end of the rigid panel downwardly. The rigid panel 14 is accordingly lowered without pivoting to assume the position illustrated in FIG. 6.

As the rigid panel lowers under the influence of the movement of the forward shoes, the pin 80 engages the bottom of the slot in the member 82, thereby compressing the leaf spring 74 (as shown in phantom in FIG. 5) and urging the locking portion 73 below the guide rail. At this time, the rigid panel is unlocked and further traction of the forward shoes in the rearward direction of arrow A induces the sun roof (viz., the rigid panel and associated mechanism) to slide to the right (as shown in the drawings) into the housing 23.

It will be noted that as the rear shoes 58 abut the stop 60 during the lowering of the rigid panel, the distance between the forward and rear shoes decreases, due to the displacement of the forward shoes toward the rear ones. This tends to induce smooth sliding of the arrangement along the guide rails and cables, ensuring smooth movement of the sun roof into and out of the storage area or housing 23.

When it is desired to tilt the sun roof for ventilation purposes (see FIG. 7), the cables are activated to track the forward shoes 50 in the forward direction of arrow B. This causes the pins 52 to trace to the lowermost portion of the shaped slots 48. Simultaneously, the linkage system 61 is pulled forward to force the rear shoes 58 against the stops 60, causing the rods 64 to pivot in a counterclockwise direction about the pins 66, providing the situation depicted in FIG. 7, wherein the rear or aft end of the rigid panel is raised above the roof panel 20. The shape of the first guide plate shaped slot 48 is designed so that as the pins 52 trace therein and the rods 64 pivot counterclockwise, the combined effect is that the rigid panel pivots about the weather strip 44 along the forward edge of the rigid panel 14, so that the weather strip "rolls" along the surface of the roof panel downward depending flange, to reduce the abrasive effect of the interface therebetween. As the rigid panel tends to tilt about an axis defined by the pins 52, the elevation provided by the movement of the pins 52 to the lowermost portion of the shaped slots 48 is offset by the tendency for the forward end to drop due to the pivoting of the panel about the pins 52. Thus, the rigid panel 14 effectively pivots about the forward edge thereof, eliminating any abrasion of a sealing or weather strip 44 provided about the periphery of the rigid panel.

Figure 8:
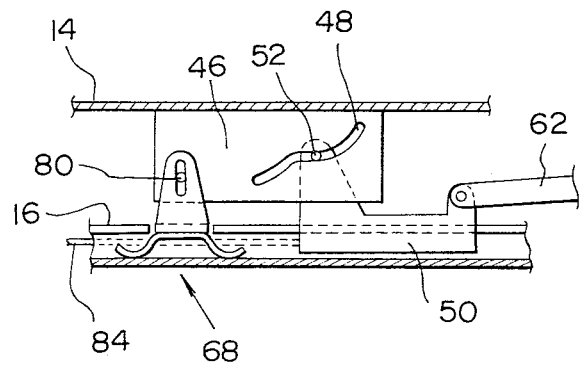
FIG. 8 is view similar to FIGS. 4 to 7, showing a modification of part of the first embodiment.

FIG. 8 shows a possible variation of the construction of the locking arrangement 68 shown in FIGS. 4 to 7. As will be appreciated, the bracket 78 has been replaced by moving the pin 80 onto the forward guide plate 46. The inherent simplification in construction will be apparent.

Figure 9:
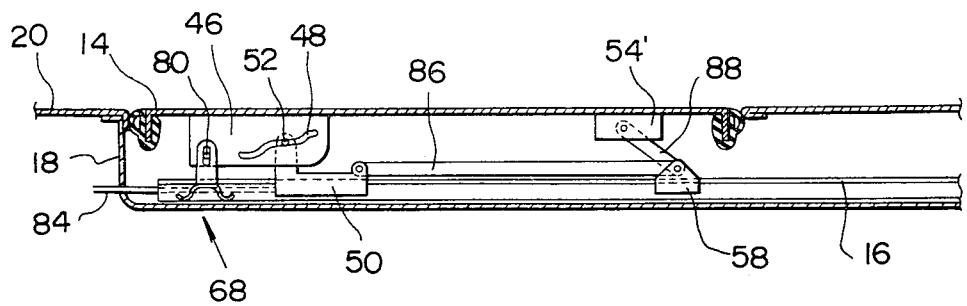
FIGS. 9 to 11 are sectional views similar to FIGS. 4 to 7, showing a second embodiment of the present invention.
Figure 10:
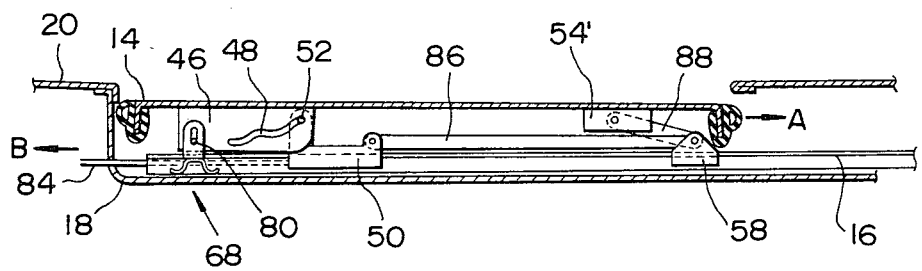
Figure 11:
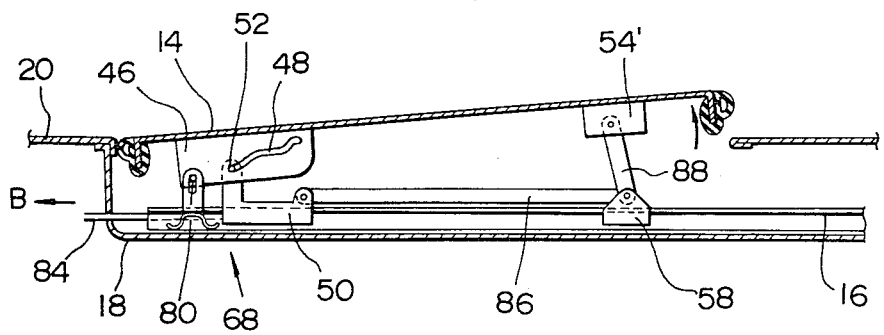

Turning now to FIGS. 9 to 11, a second embodiment of the present invention is shown. This embodiment closely resembles the first but differs in that the linkage system has a pair of arms or rods 86, each interconnecting a front shoe and a rear shoe. The linkage further includes a second pair of arms or rods 88 pivotally connected at their ends to a rear shoe 58 and a rear guide plate 54. With this arrangement, due to the interconnection of the front and rear shoes by the rods 86 which maintain a constant distance between the front and rear shoes, the stop 60 of the previous embodiment is unnecessary.

In operation, like the first embodiment, when the cables 84 are moved in the rearward direction indicated by arrow A, the forward shoes 50 are also moved therewith, accordingly causing the rods 86 to simultaneously move the rear shoes 58 which, in turn, induces the second rods 88 to rotate to assume the position illustrated in FIG. 10. This pulls the rear end of the rigid panel 14 downwardly. At the same time, the pins 52 slide up to the highest points of the shaped slots 48, pulling the forward end of the rigid panel 14 downward. The rigid panel 14 hence descends into the space between the roof panel 20 and the frame 18 without tilting. As with the first embodiment, upon the rigid panel's having descended by a predetermined amount and having assumed a suitable level for entry into the housing 23, the locking arrangement 68 is moved downwardly to release and render the sun roof unit slidable so that upon futher traction of the forward shoes by the cables 84 the sun roof slides along the guide rails into the housing.

In this embodiment, the locking arrangement 68 is like the arrangement shown in FIG. 8, incorporated with the first guide plates, and functions in an identical manner.

Figure 12:
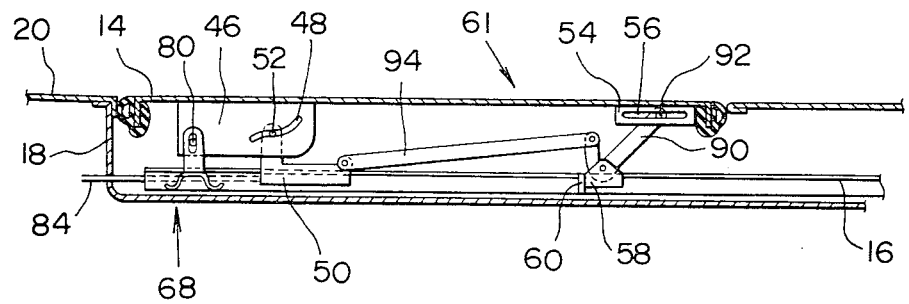
FIGS. 12 to 14 are sectional views similar to FIGS. 4 to 7, showing a third embodiment of the invention.
Figure 13:
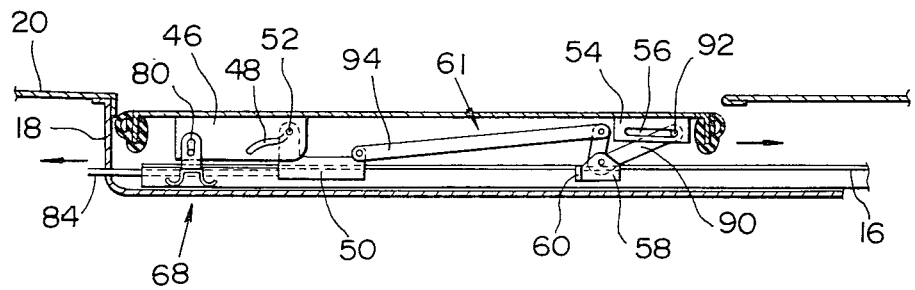
Figure 14:
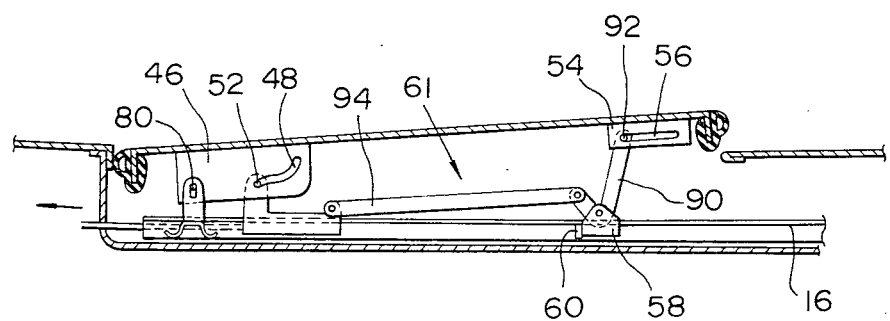

FIGS. 12 to 14 shown a third embodiment of the present invention. This embodiment is very similar to the former two and differs only in the construction of the linkage system. In this case the linkage system takes the form of a pair of bell crank levers 90 each pivotally connected at their elbows to a second or rear shoe 58. The second guide plates 54 are each formed with a slot 56 similar to the first embodiment. These slots slidably receive pins 92 carried on the ends of the bell crank levers 90. The other ends of the bell crank levers are pivotally connected to connecting rods or arms 94 which are each pivotally connected to a forward shoe 50.

In this embodiment, the locking arrangement is the same as that described in connection with FIG. 8 and the second embodiment and functions in an identical manner.

The operation of this third embodiment is very similar to that of the first embodiment with the exception of the action of the bell crank levers which replace the rods or levers 62. A stop 60 again limits the movement of the rear shoes 58 toward the forward end of the rigid panel so that as the forward shoes 50 are moved in the rearward direction indicated by the arrow A, the distance between the forward and rear shoes decreases and the bell crank lever 90 is rotated in the clockwise direction to assume the position illustrated in FIG. 13 (at this time the rear shoes 58 are held in stationary abutment with the stop 60). As with the previous embodiments, as the forward shoes are drawn in the direction of the arrow A, the pins 52 slide up their respective slots 48 to highest ends thereof. Accordingly, the rigid panel 14 is pulled downwardly without tilting and, upon having descended by a predetermined amount, unlocks the locking arrangement 68. Further traction by the cables 84 moves the sun roof into the housing 23 opening the sun opening 22.

The tilting operation is also very similar to that of the first embodiment and is achieved by tracking the forward shoes in the forward direction indicated by the arrow B, which drives the pins 52 to the lowest points of the slots 48 and simultaneously causes the bell crank levers 90 to rotate counterclockwise to assume the position illustrated in FIG. 14. As in the previous embodiments, the shape of the first guide plate shaped slot 48 is designed so that as the pins 52 trace therein and the bell crank levers 90 pivot counterclockwise, the combined effect is that the rigid panel pivots about the weather strip 44 along the forward edge of the rigid panel, thus preventing any unwanted abrasion to the weather seal.

In summary, the present invention takes the form of a sun roof which includes an actuating mechanism by which the rigid panel which closes the sun roof opening can be lowered without tilting, somewhat like an elevator, into the space defined between the roof panel and a frame (which serves to mount the sun roof in place), and thereafter be slid back into a housing rearward of the sun roof opening. The invention also provides for a tilting operation wherein only one end of the panel is moved, the tilting mechanism being designed so that the roof panel in effect pivots about the stationary end thereof.

Further, the front and rear sets of shoes which serve to transport the sun roof in and out of the housing are arranged to either approach each other or remain at a fixed distance from each other which ensures smooth, shudder-free movement along the guide rails, allowing a reduction in the traction force required to move the sun roof, as compared with the prior art arrangements wherein the distance between the shoes increases during the storage operation.

We claim:

1. In a vehicle having a cabin and a roof panel formed with a first opening, a sun roof comprising:
    a frame fixed to the inboard surface of said roof panel to define a space between said roof panel and said frame, said frame being formed with a second opening which cooperates with said first opening to define a sun roof opening;
    a rigid panel for closing said first opening;
    first and second guide rails secured to said frame, said first guide rail being disposed on one side of said second opening and said second guide rail being disposed on the other side of said opening;
    first and second shoes slidably disposed on said first and second guide rails, respectively, each of said first and second shoes having a pin thereon;
    third and fourth shoes slidably mounted on said first and second guide rails, respectively;
    first and second guide plates depending from a first end of said rigid panel, said first guide plate being formed with a first shaped slot for receiving said pin of said first shoe therein, said second guide plate being formed with a second shaped slot for receiving said pin of said second shoe therein, said first and second shaped slots being shaped to extend upwardly toward said rigid panel as they extend toward a second end of said rigid panel;
    third and fourth guide plates depending from said second end of said rigid panel, and
    a linkage system interconnecting said first and second shoes with said third and fourth shoes,
    said linkage system and said first and second guide plates cooperating so as to
    (a) cause said rigid panel to lower away from said first opening toward said second opening and into said space without tilting, when said first and second shoes are driven from a home position in a first direction through a predetermined distance along said first and second guide rails, and thereafter, upon subsequent driving of said first pair of shoes in said first direction, to move away from between said first and second openings to open said sun roof opening, and (b) when said first and second shoes are driven from said home position in a second direction, cause said rigid panel to pivot about one end thereof so that the other end thereof is lifted above the plane defined by said first opening.

2. A sun roof as claimed in claim 1, further comprising:
a stop formed on said frame for limiting the movement of said third and fourth shoes toward said first and second shoes; and
said linkage system including first and second arms pivotally interconnected at the first ends thereof by a pin which slides in a slot formed in said third guide plate, and third and fourth arms pivotally interconnected at the first ends thereof by a pin which slides in a slot formed in said fourth guide plate, said first and third arms being pivotally connected at the second ends thereof to said first and second shoes, respectively, and said second and fourth arms being pivotally connected at the second ends thereof to said third and fourth shoes, respectively.

3. A sun roof as claimed in claim 1, wherein said linkage system comprises:
first and second arms interconnecting said first and third and said second and fourth shoes, respectively, a third arm pivotally connected at one end thereof to said third shoe and pivotally connected at the other end thereof to said third guide plate, and a fourth arm which is pivotally connected at one end thereof to said fourth shoe and pivotally connected at the other end thereof to said fourth guide plate.

4. A sun roof as claimed in claim 1, further comprising:
a stop formed on said frame for limiting the movement of said third and fourth shoes toward said first and second shoes; and
said linkage system including first and second arms pivotally mounted at one end thereof to said first and second shoes, respectively, and first and second bell crank levers pivotally mounted on said third and fourth shoes, respectively, said first and second bell crank levers pivotally connected at one end thereof to the other end of said first and second arms, respectively, and having a pin at their other end thereof which slides in a slot formed in said third and fourth guide plates, respectively.

5. A sun roof as claimed in claim 1, further comprising:
locking means for locking said rigid panel in a preselected position, said locking means being unlocked when said rigid panel is lowered into said space by a predetermined amount; and
drive means operatively connected to said first and second shoes for driving said first and second shoes in first and second directions along said guide rails.

6. A sun roof as claimed in claim 5, wherein said locking means comprises;
an aperture in one of said first and second guide rails; a slide member associated with each said guide rail, said slide member having a locking portion disposed within said aperture preventing said slide member from moving along said guide rail;
biasing means on said slide member for biasing said slide member toward said rigid panel and urging said locking portion into said aperture; and
a lost motion linkage interconnecting said slide member and said rigid panel and allowing said rigid panel to be lowered into said space by a predetermined amount before said slide member is moved against the bias of said biasing means and said locking portion is moved out of said aperture and said slide member is slidably moved along said guide rail.

7. A sun roof as claimed in claim 6, wherein said lost motion linkage comprises:
a bracket depending from said rigid panel, said bracket having a pin; and
a slotted member on said slide member which receives said pin therein so that the rigid panel may decend by said predetermined amount toward said slide member before said pin engages the bottom of the slot in said slotted member.

8. A sun roof as claimed in claim 6, wherein said lost motion linkage comprises:
a pin on a first guide plate; and
a slotted member on said slide member which receives said pin therein so that the rigid panel may decend by said predetermined amount toward said slide member before said pin engages the bottom of the slot in said slotted member.

9. In a vehicle having a cabin and a roof panel formed with a first opening, a sun roof comprising:
a frame fixed to the inboard surface of said roof panel to define a space between said roof panel and said frame, said frame being formed with a second opening which cooperates with said first opening to define a sun roof opening;
a rigid panel for closing said first opening;
a pair of guide rails secured to said frame, one on either side of said second opening;
first and second pairs of shoes slidably mounted on said guide rails; and
linkage means interconnecting said first and second pairs of shoes and said rigid panel for
(a) causing said rigid panel to lower away from said first opening toward said second opening and into said space without tilting, when said first pair of shoes are moved by a predetermined amount in a first direction along said guide rails, and thereafter, upon subsequent movement of said first pair of shoes in said first direction, causing said rigid panel to move away from between said first and second openings to open said sun roof opening, and
(b) causing said rigid panel to pivot about one of its ends, when said first pair of shoes are moved in a second direction, so that the other end of said rigid panel is lifted above the plane defined by said first opening.

10. A sun roof as claimed in claim 9, wherein said first and second pairs of shoes approach each other when said first pair of shoes are moved in said first direction.

11. A sun roof as claimed in claim 9, wherein said first and second pair of shoes remain at the same distance apart when said first pair of shoes are moved in said first direction.

* * * * *